April 30, 1957 W. J. TAMMINGA 2,790,661
COMBINED GASKET AND RETAINER
Filed Nov. 27, 1953 3 Sheets-Sheet 2
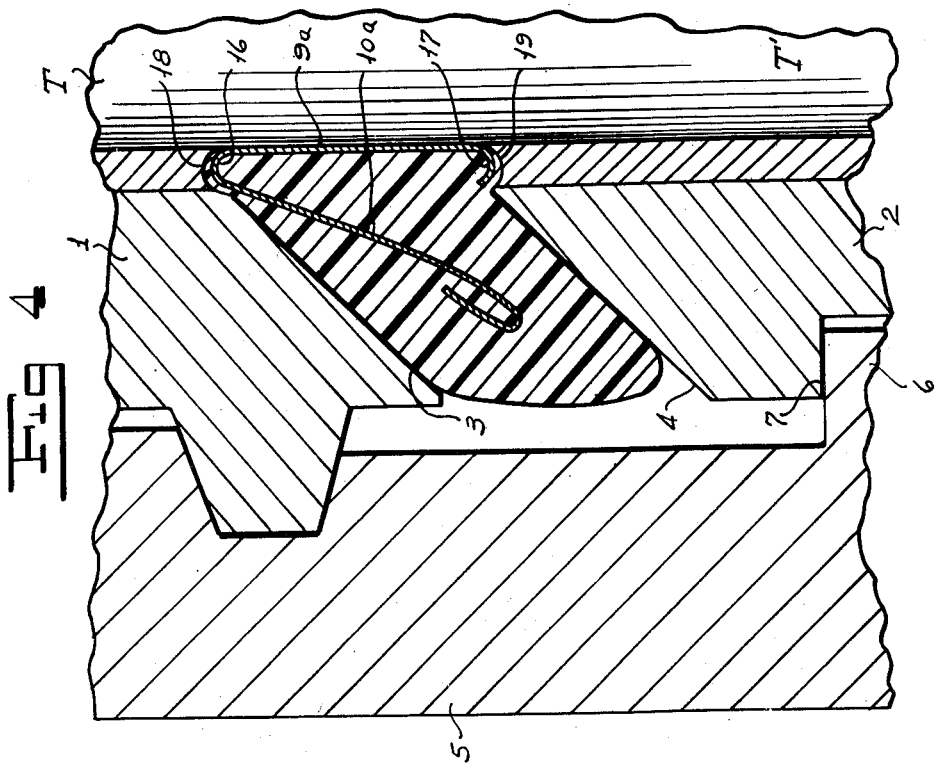
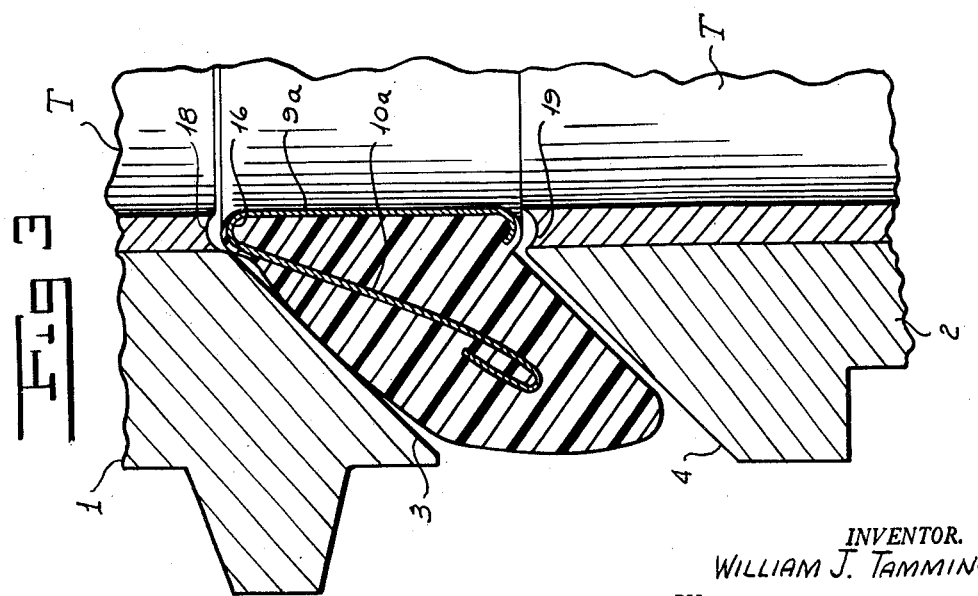
INVENTOR.
WILLIAM J. TAMMINGA
BY
Cornelius Zaluska
ATTORNEY April 30, 1957 W. J. TAMMINGA 2,790,661
COMBINED GASKET AND RETAINER
Filed Nov. 27, 1953 3 Sheets-Sheet 3
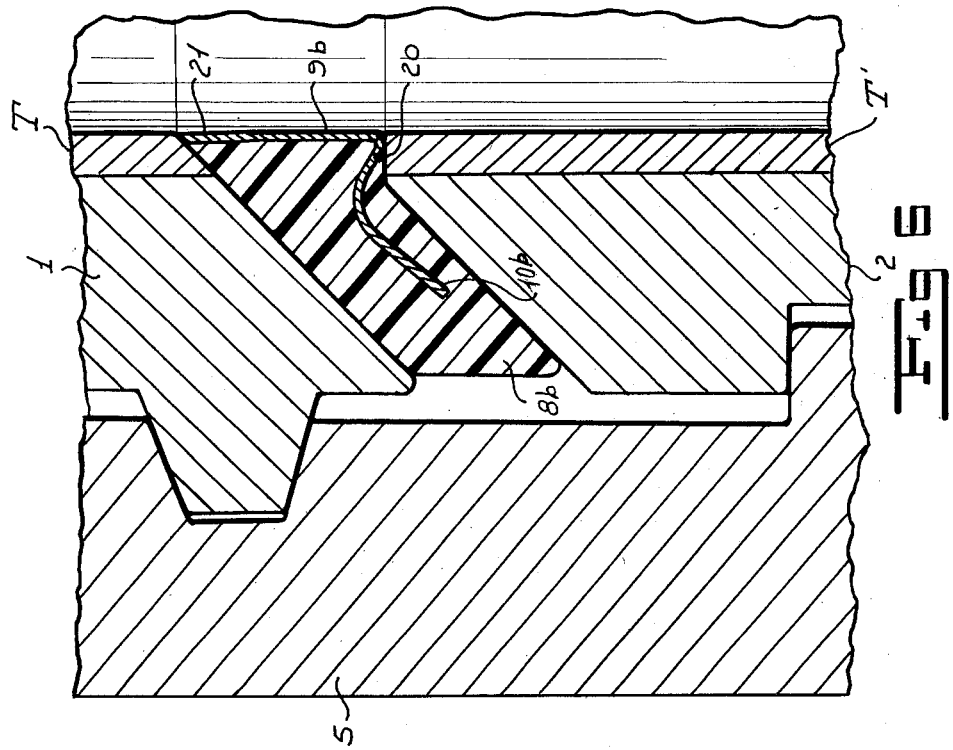
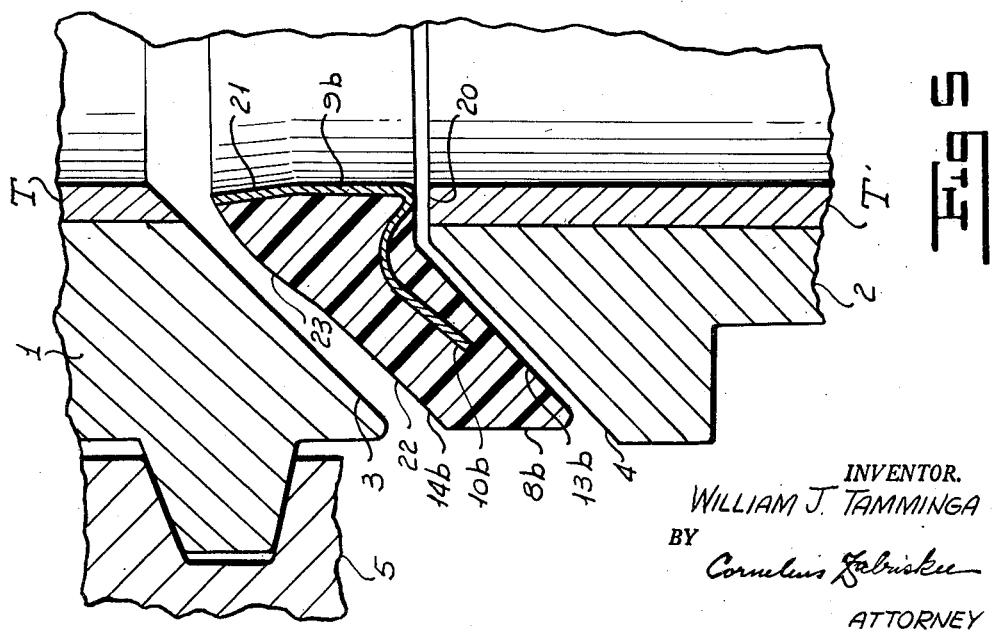
INVENTOR.
WILLIAM J. TAMMINGA
BY
Cornelius Zabriskie
ATTORNEY

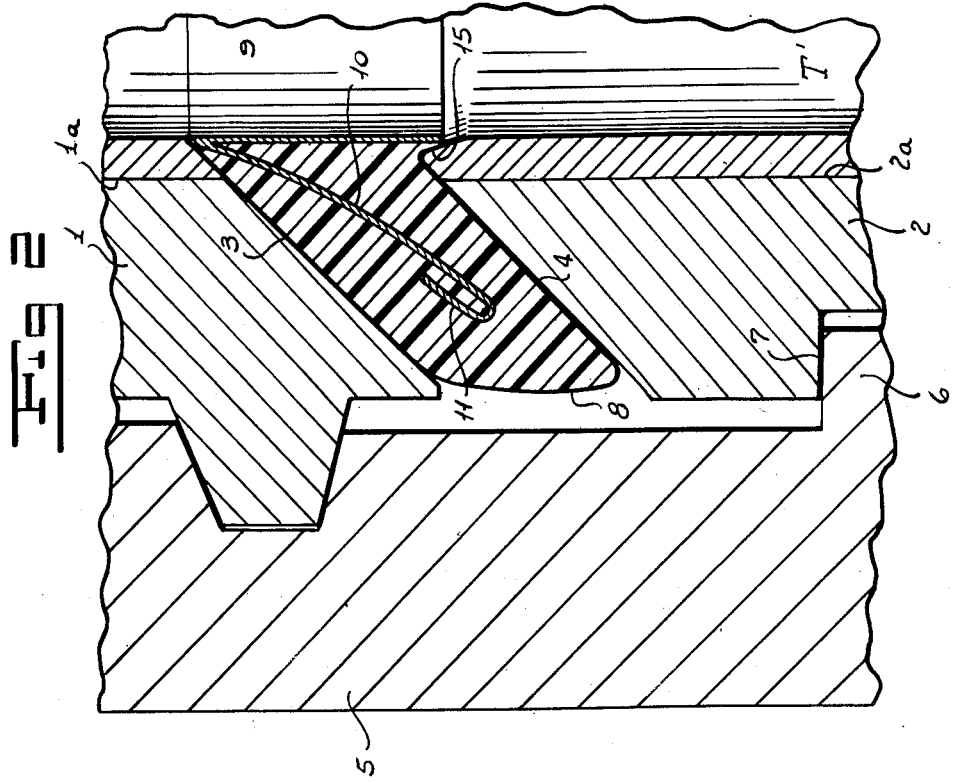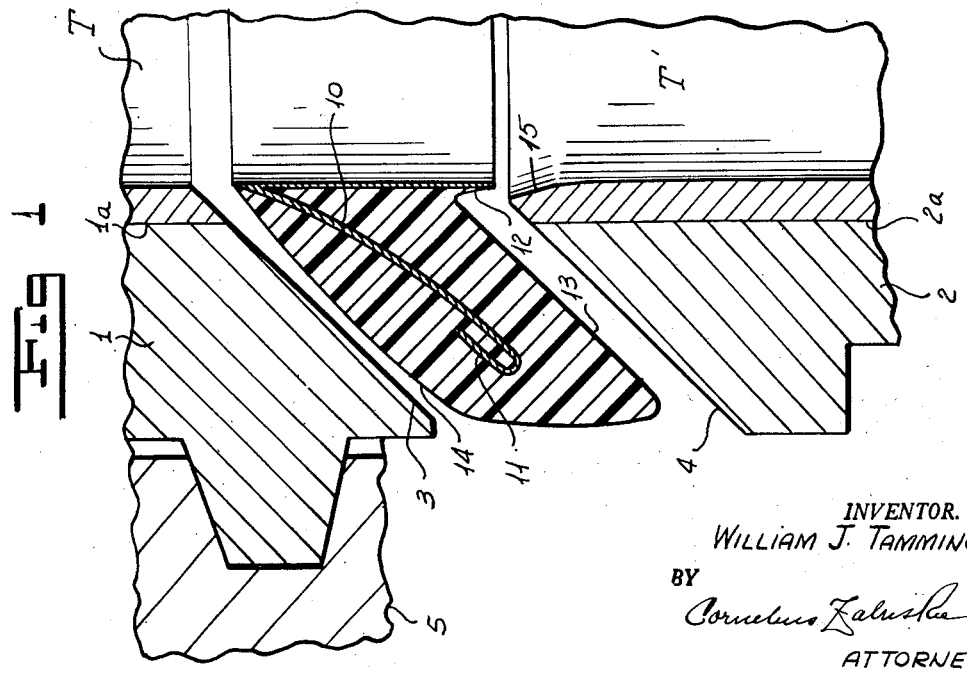

2,790,661
COMBINED GASKET AND RETAINER

William J. Tamminga, Goshen, N. Y., assignor to Wiz-Products, Inc., Goshen, N. Y., a corporation of New York Application November 27, 1953, Serial No. 394,808

5 Claims. (Cl. 288—23)

This invention, which is a continuation-in-part of my copending application Serial No. 347,559, filed April 8, 1953, now abandoned, relates to gaskets adapted for use in lines for conveying milk in dairies, milk processing plants, and the like.

Milk conveying lines in this environment generally embody successive lengths of tubing, the contiguous ends of which are secured by couplings. Each coupling embodies a ferrule soldered, brazed or otherwise secured to an end of each tube, a cooperating ferrule similarly secured to the contiguous end of the next adjacent tube, and a clamping nut engaging with the ferrule of one tube end and having threaded engagement with the companion ferrule of the adjacent tube end. The contiguous ends of each two adjacent ferrules have surfaces to engage an interposed gasket and are adapted to be tightly engaged with said gasket through the action of the clamping nut.

Various types of gasket have been used in this connection, but such gaskets are open to numerous disadvantages. For example, if the nut is screwed too tightly, these gaskets are apt to be squeezed into the interior of the tubing, so that they not only constrict the flow of milk through the tubing, but also tend to produce leaky joints. Furthermore, most gaskets, as previously employed, do not properly seal the soldered joints between the ferrules and the tube ends. They permit milk to come in contact therewith and the lactic acid in the milk attacks the solder and forms pinholes in which bacteria may lodge and thus destroy the sterility of the system. Moreover, all gaskets presently in use are so constituted that the tubing system cannot be kept clean without frequently dismantling all the joints of the system.

The milk people have long sought a satisfactory joint between tube sections which would be substantially permanent in its nature, i. e., one which would permit the tubing system to be properly cleaned and rendered sterile without dismantling the system. With such a system it would be possible to keep the system intact for months on end and sterile at all times by flushing the same occasionally with a detergent solution under high pressure. The present invention provides such a system, free from the objections referred to and others, and thoroughly practical and efficient.

I am able to accomplish these results by employing a rubber gasket of annular form, the inner periphery of which is of slightly greater diameter than the internal diameter of the system and the inner periphery of which gasket is faced or covered by a retainer ring provided with an outwardly projecting flange embedded in the rubber of the gasket in such manner as to firmly anchor the gasket to the ring. The ring and its flange collectively constitute and serve as a gasket retainer. The rubber gasket is preferably vulcanized to said flange and to the ring to preclude their separation and the said gasket is so formed as to seal the joints between the ferrules and the tube ends and also produce a seal with the tube ends and the contiguous surfaces of the ferrules, as will be hereinafter more fully explained in detail.

In the preferred practical form of the invention, the retainer ring is made cylindrical with an inner diameter corresponding to that of the tubing with which it is to cooperate and one end of the ring is extended to form a circumferential flange so configurated as not to interfere with the sealing function of the gasket. Such a retainer may be fabricated from sheet material by simple stamping operations in an economical and efficient manner and will function efficiently in the performance of its intended functions.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

Figure 1 is a diametric cross section through the wall of contiguous ends of two tube sections with associated ferrules and clamping nut and with a gasket and retainer embodying the present invention incorporated in the joint. In this figure, the tube ends are separated from the gasket.

Figure 2 is a like section showing the parts "made up."

Figures 3 and 4 are views like Figures 1 and 2, but show a modified form of gasket and retainer embodying the present invention.

Figures 5 and 6 are views like Figures 1 and 2, but showing a further modified form of the invention.

In the accompanying drawings T and T' designate the contiguous ends of two alined tubes. A threaded ferrule 1 of conventional form is secured by a soldered joint 1a to the tube T, while a ferrule 2 is soldered to the tube T' at a joint 2a. The corresponding ends of the ferrule 1 and the tube T are provided with a sealing surface 3, while the corresponding ends of the ferrule 2 and the tube T' have a sealing surface 4. These two sealing surfaces 3 and 4 are shown as complementary and frustoconical. A conventional clamping nut 5 is threaded to engage with the threaded ferrule 1 and is provided with a flange 6 for engagement with a shoulder 7 on the ferrule 2, as best shown in Figure 2. The structure thus far described is that of a conventional coupling.

The combined gasket and retainer of this invention, as shown in Figures 1 and 2, embodies a gasket 8 and a gasket retainer. The gasket 8 is in the form of a rubber annulus adapted to be positioned between the contiguous ends of the tubes and between the sealing surfaces 3 and 4, while the inner periphery of that rubber gasket is faced by the cylindrical retainer ring 9, the internal diameter of which is substantially the same as the inner diameter of the tubes T and T'. One end portion of the retainer ring is extended to form an annular flange 10, so configurated that it extends into the body of the gasket 8, as clearly shown in Figures 1 and 2, the outer periphery of the flange 10 being loosely returned upon itself as at 11.

In practice, it is convenient and highly economical to form the ring 9 and its flange 10 from flat sheet stock through successive operations of stamping and forming dies. For example, the cylindrical ring portion 9 may be drawn from flat stock by drawing dies and the drawn end stamped out. The flange 10 and its returned end 11 may be shaped as shown by forming and bending dies. This is the preferred manner of making the retainer, although if some materials are used, they may be molded or formed from tubing by spinning operations. However, milk conduits and their couplings are commonly made from stainless steel or dairy metal and I prefer to make the retainer of either of these materials, in which case the stamping operations may be more satisfactorily carried out.

The gasket is preferably associated with the retainer by molding the gasket in place thereon and vulcanizing the rubber from which the gasket is formed. When so molding the rubber, a portion thereof is preferably so disposed as to taper off, as shown at 12 in Figure 1, to one edge of the ring 9 and the corresponding face 13 of the gasket is preferably made of frusto conical form to seat upon the surface 4 of the associated ferrule. The opposite face 14 of the gasket is molded in slightly bulged form, as shown, and extends to the corresponding end of said ring.

In the form of the invention shown in Figures 1 and 2, the end of the tube T' is preferably slightly chamfered as at 15, so that, when the gasket is in place and the nut 5 tightened, the corresponding end of the ring may enter into the clearance thus provided until the nut 5 is screwed tightly enough to sufficiently compress the gasket to form a tight seal with both of the surfaces 3 and 4 of the ferrules. When this has been accomplished, the tube ends will be drawn together sufficiently to cause one end of the retainer portion to enter into the tube T' for a short distance and engage the chamfered surface 15, so as to produce a straight-through uninterrupted conduit of uniform diameter at the coupling.

When the parts are thus drawn into their ultimate relation shown in Figure 2, the joints 1a and 2a will be completely sealed, so that milk cannot enter into them and attack the solder thereof. In fact, the opposite ends of the facing portion of the retainer will actually engage with the tube ends in metal to metal contact when the coupling is made up tightly, so that there is little, if any, contact of the milk with the rubber of the gasket. This is manifestly highly desirable as deterioration of the gasket is minimized and at the same time there are no cavities left for the lodgement of bacteria. This is particularly notable when it is understood that the retainer of this invention may be made quite thin, usually only a few thousandths of an inch thick.

The modified form of construction shown in Figures 3 and 4 is in many respects similar to that of the preceding figures, but with the exception that both ends of the ring 9a of Figures 3 and 4 are curved outwardly to form beads 16 and 17. A flange 10a, which corresponds to the flange 10, forms an extension in this instance of the bead 16. To permit of proper cooperation of a retainer of this kind with the tube ends, said tube ends are provided in the contiguous edges of the tubes, with channels 18 and 19 complementary to the shaping of the beads 16 and 17, respectively, as shown best in Figure 4. When molding the rubber gasket to this type of retainer, the rubber is carried over both of the beads 16 and 17 and tapers off to the inner face of the ring, so that, when the coupling is made up tightly, an effective seal is produced and yet the liner portion 9a may come into metal to metal contact, or substantially so, with the tube ends.

In both forms of the invention shown in Figures 1–4, one of the tubes is chamfered or both of the tubes are provided with the channels described. However, with the construction of Figures 1 and 2, it is sometimes possible, if one or both of the tubes are slightly over-size in internal diameter, to associate the present invention with such tubes without chamfering either of them. The invention is therefore to be understood as not necessarily limited to the chamfering operation. It is also within this invention to form one end of the ring with a bead, as shown in Figures 3 and 4, while the other end of said ring is formed as in Figures 1 and 2.

In the construction of Figs. 5 and 6, neither of the tubes T and T' is chamfered as at 15 in Figs. 1 and 2, nor channeled as shown at 18 and 19 in Figs. 3 and 4. On the contrary, the end of the tube T is conventionally shaped to correspond to and form a continuation of the surface 3 of the associated ferrule 1, while the contiguous end of the tube T' is preferably formed in a flat cross axial plane, as indicated at 20, and this plane intersects with the frusto conical surface 4 of the ferrule 2 as clearly appears in Fig. 5. If desired, however, the end of the wall of the tube T' may be shaped to form a continuation of the face 4, so that both frusto conical surfaces between which the gasket is positioned will be complementary in shape.

The retaining ring 9b may be formed cylindrical throughout its height but substantially the upper half thereof is preferably slightly flared outwardly, as indicated at 21. This flare is of less extent than the thickness of the wall of the tube T which thickness is conventional. The inside diameter of the retainer 9b is substantially equal to the standard conventional tubes used in dairy equipment.

The end of the retaining ring opposite to that where it is flared is provided with an integral outwardly extending flange 10b, which is preferably curved upwardly and then downwardly, as shown, and this flange is embedded within the rubber gasket 8b. The lower face 13b of the gasket is shaped complementary to the end of the tube T' and the surface 4 of the ferrule on which it is adapted to seat. The opposite face 14b of such gasket may be bulged throughout, as in the preceding figures, although, in practice, I preferably make a substantial portion 22 of said surface frusto conical while the remaining portion 23 of said surface is slightly bulged and tangent with the upper edge of the ring, as shown in Fig. 5, this bulge extending to the retainer ring. The gasket is vulcanized to the retaining ring and its flange throughout the contacting portions of these parts, so that they may be handled as a unit and to insure the proper cooperative relation at all times.

The combined gasket and retainer, shown in Figs. 5 and 6, is used in the same manner as the structures of the preceding figures of the drawings, but the mode of operation of the gasket and retainer under stress is somewhat different.

When the clamping nut 5 is tightened to draw the pipe ends and ferrules together from the separated positions shown in Fig. 5, the gasket will immediately seat upon the ends of the tube T' and the lower ferrule. The ferrule 1 will first contact with the bulge 23 of the gasket, but, as the ferrules are drawn together, this bulge will be flattened out, so that it, as well as the lower edge of the tube T will exert a contracting force upon the upper flared portion of the retaining ring. The flare is such that this upper edge of the ring will engage the tube end somewhere within the thickness of the tube wall and the fact that the ring is flared will assure contact between the ring and the tube wall, even though such tube is slightly oversize or undersize in diameter.

When the clamping nut has been screwed tightly into final position, the parts will appear as shown in Fig. 6, wherein the upper edge of the retainer will engage with the end of the tube T, while the bend between the flange 10b and the ring will bear against the contiguous end of the wall of the tube T'. The rubber gasket will overlie and seal the joints between the tube ends and their respective ferrules and isolate said joints from contact with milk passing through the thus coupled together tubes. The metal to metal contact between the retaining ring and the tube ends will isolate the gasket from contact with strong detergent and sterilizing agents which may be passed through the tube and thus materially add to the life of the gasket.

The structure of Figs. 5 and 6 constitutes the preferred form of this invention because of its ease of manufacture, it being more simple to form the outwardly extending relatively short flange, as shown in these figures, than the longer flange shown in the preceding figures, particularly when the parts are made of the stainless steel commonly used in the handling of milk.

The combined gasket and retainer constructions of this invention provide absolutely liquid-proof couplings which effectually seal the joints between the tube ends and between the ferrules and the tubes. They protect the gasket against deterioration from the sterilizing agents and provide straight-through unconstricted passages. The retainer ring positively precludes the gasket from being forced into the confines of the tubes as so frequently occurs with prior constructions. The gasket employed is preferably of rubber, but any suitable equivalent material may be employed.

The foregoing detailed description sets forth the invention in certain of its preferred practical forms, but the invention is to be understood as illustrative, only, and not as defining the limits of the invention.

Having thus fully described the invention, what I claim as new and desire to secure by Letters Patent is:

1. A combined gasket and retainer comprising: a rubber gasket having substantially the form of a frustum of a hollow cone having a re-entrant side with at least the major portion of the sealing face at its re-entrant side frustoconical while its opposite cross face is convex for at least a portion of its width, and a substantially cylindrical tubular retaining ring substantially coextensive axially with and lining the opening in the smaller end of the frustum, with the entire inner circumferential surface of the ring uncovered and exposed, said ring being provided at one of its ends with a flange extending outwardly into the interior of the frustum and completely embedded therein to leave all surfaces of the gasket except that which abuts the ring uncovered and exposed.

2. A combined gasket and retainer for milk conveying systems comprising: a tubular metal ring, the inner surface of which is exposed for its entire length, said ring being provided at one end with an integral outwardly flaring skirt-like flange, a rubber gasket having substantially the shape of a frustum of a hollow cone exteriorly embracing the ring for the entire length of the latter and completely enclosing the flange to leave uncovered and exposed all surfaces of the rubber gasket except that surface thereof which engages directly with the ring, the central opening of the gasket having an axial dimension substantially equal to the axial dimension of the ring.

3. A combined gasket and retainer according to claim 2, wherein the exposed surface of the gasket adjacent the end of the ring remote from the substantially flanged end of the latter is provided contiguous to the ring with an outwardly protruding bulge while the remainder of such surface is substantially frustoconical.

4. A combined gasket and retainer according to claim 2, wherein the tubular ring is cylindrical for a portion of its axial length and substantially frustoconical for the remainder of its length.

5. A combined gasket and retainer according to claim 3, wherein the ring is cylindrical for a portion of its length and substantially frustoconical for the remainder of its length in the region of said bulge.

References Cited in the file of this patent

UNITED STATES PATENTS

| | | |
|---|---|---|
| 75,151 | Gould | Mar. 3, 1868 |
| 469,830 | Cain | Mar. 1, 1892 |
| 744,505 | Dixon | Nov. 17, 1903 |
| 790,093 | Wiedeman | May 16, 1905 |
| 980,671 | Price | Jan. 3, 1911 |
| 1,544,004 | Henderson | June 30, 1925 |
| 1,955,832 | Raybould | Aug. 24, 1934 |
| 2,002,122 | McWane | May 21, 1935 |
| 2,014,313 | Damsel | Sept. 10, 1935 |
| 2,069,212 | Buffington | Feb. 2, 1937 |
| 2,243,265 | Thomson | May 27, 1941 |
| 2,249,127 | Goetze | July 15, 1941 |
| 2,327,837 | Williams | Aug. 24, 1943 |
| 2,450,195 | Grantham | Sept. 28, 1948 |
| 2,695,795 | Tamminga | Nov. 30, 1954 |
| 2,717,793 | Nenzell | Sept. 13, 1955 |

FOREIGN PATENTS

| | | |
|---|---|---|
| 284,843 | Great Britain | Feb. 9, 1928 |
| 559,966 | France | June 27, 1923 |